United States Patent [19]

Lamy et al.

[11] 4,353,449
[45] Oct. 12, 1982

[54] CONTROL FORK FOR A GEAR BOX SLIDING BLOCK

[75] Inventors: Jean M. Lamy, Paris; Jacques Egret, Les Clayes-sous-Bois, both of France

[73] Assignee: Regie Nationale des Usines Renault, Boulogne-Billancourt, France

[21] Appl. No.: 185,591

[22] Filed: Sep. 9, 1980

[30] Foreign Application Priority Data

Sep. 20, 1979 [FR] France ................. 79 23443

[51] Int. Cl.³ .................. G05G 3/00; G05G 9/12; F16D 13/58
[52] U.S. Cl. ..................... 192/82 R; 29/453; 74/473 R
[58] Field of Search ............ 192/82 R; 74/473 R; 29/453

[56] References Cited

U.S. PATENT DOCUMENTS

| 3,097,030 | 7/1963 | Hartley | 29/453 X |
| 3,257,861 | 6/1966 | Siefferman | 74/473 R |
| 3,915,027 | 10/1975 | Simmons et al. | 192/82 R X |
| 4,238,012 | 12/1980 | Takiguchi | 192/82 R X |

FOREIGN PATENT DOCUMENTS

| 54-144580 | 11/1979 | Japan | 74/473 R |
| 54-144582 | 11/1979 | Japan | 74/473 R |

*Primary Examiner*—Allan D. Herrmann
*Attorney, Agent, or Firm*—Owen, Wickersham & Erickson

[57] ABSTRACT

A synchronization and clutch control fork for a gear box. The fork has notched outer lateral surfaces. Two friction shoes are mounted on the two arms of the fork. Each shoe comprises two lugs inside its lateral flanks. The lugs are snap fit into two notches in the outer lateral surfaces of the arms of the fork. The two arms of the fork are intended to come into contact with the periphery of a driving gear.

5 Claims, 10 Drawing Figures

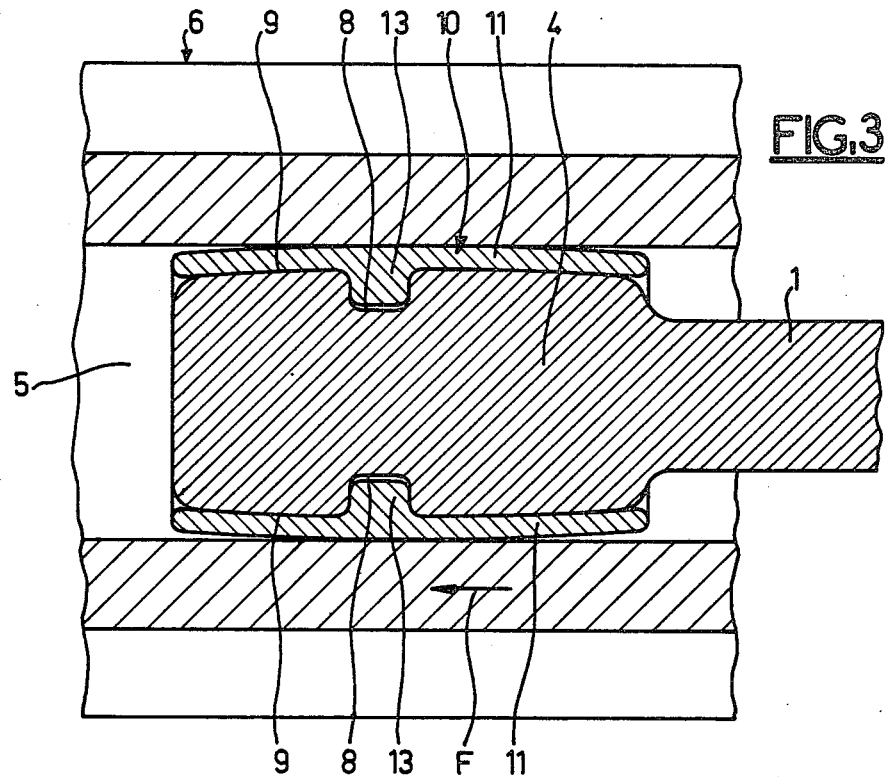
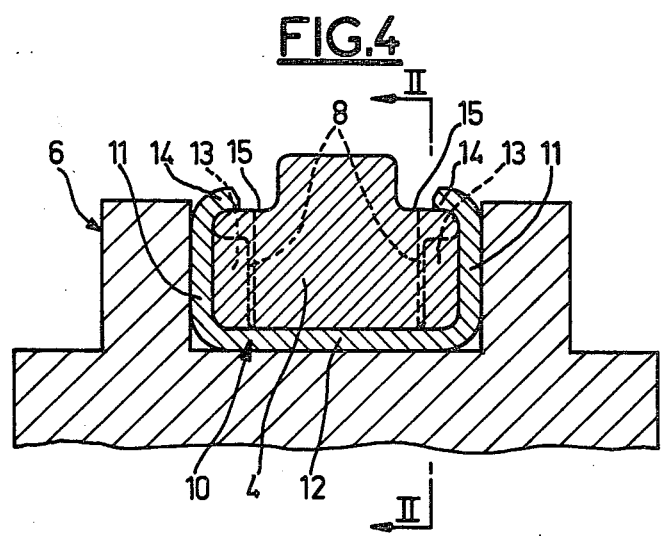

CONTROL FORK FOR A GEAR BOX SLIDING BLOCK

The present invention relates to a synchronization and clutch control fork for cooperation with a gear box sliding block, for example for automotive vehicles.

This type of control fork usually comprises two arms going around the periphery of a sliding gear that is rotated during operation of the gear box. The control forks must be sufficiently resistant to absorb the synchronization stresses which they transmit during operation of the gear box. Further, the ends of their arms which come into contact with the outer surface of the sliding gear must have a low-coefficient of friction and good resistance to wear.

Such control forks are frequently made by casting a copper-aluminum alloy which makes it possible to impart good friction characteristics to the ends of the fork arms, and, because of the use of this material, the fork also has good mechanical resistance. The use of brass offers the same advantages. On the other hand, these two materials cause a considerable increase in weight of the control fork, and they are also quite expensive.

Control forks made by casting iron or steel, though having good mechanical resistance to absorb synchronization stresses, do not have suitable qualities so far as friction and wear in the groove of the sliding gears are concerned. It thus becomes necessary, when using these less expensive materials, to treat the surface on the ends of the fork arms which are to come into contact with the groove of the sliding gears. If, for example, a steel fork is used, high-frequency heat treatment is usually employed, or the surface is covered with high-purity chromium or molybdenum. These surface treatments again involve increasing the cost of the assembly and, further, the operation of this type of fork in contact with the sliding gears has been found to be noisy.

French Pat. No. 1,482,014, for example, shows that separate friction shoes have been provided on the body of the fork so as to enable the choice of different materials for the friction shoes which are to come into contact with the driving gear and for the fork proper. The use of separate friction shoes renders it possible for example, to make the control fork of any sufficiently resistant and low-priced material, such as cast aluminum or steel, spheroidal cast graphite, or the like. The fork may also be made of cut-out or stamped sheet iron or of synthetic plastic material reinforced with glass fibers, the dimensions of the fork being suitably selected so as to improve resistance to synchronization and dog-clutch stresses. The friction shoe which cooperates with the fork can be made of antifriction material with an unstressed synthetic plastic polyamide, such as Delrin, or of sheet iron coated with an anti-friction material such as Teflon (tetrafluorethylene), or of sheet iron which has been treated by sulfuration.

The object of the present invention is to provide a synchronization control fork comprising separate friction shoes which can be easily secured on the ends of the arms of the fork, the shoes being conveniently retained during manipulation of the control fork prior to its mounting in the gear box and being unable to come off during operation, not even after its friction surfaces are worn out.

The synchronization and dog clutch control fork for a speed box in accordance with the invention comprises two friction shoes mounted on the two arms of the fork and intended to come into contact with the periphery of a driving gear, such as a pinion gear or a dog clutch coupling. In accordance with the invention, each shoe comprises, inside its lateral flanks, two lugs which can be snapped into two slots provided on the outer lateral surfaces of the fork arms.

In a first preferred embodiment of the invention, the notches extend over the entire height of the arms of the fork. Each shoe further comprises edges which are flanged onto the outer peripheral surface of the fork arms. Due to the presence of such flanged edges which advantageously extend only over a part of the length of the shoe, once the shoes are snapped onto the ends of the fork arms, they are suitably retained on the latter during the various manipulations of the control fork before it is mounted in the gear box.

In an also preferred second embodiment of the invention, the notches on the outer surface of the fork arms extend only over a portion of the height of said arms. By simple cooperation with the notches, which do not go all the way through, the lugs of the shoes insure that the shoes are suitably maintained on the ends of the arms of the fork during manipulation of the latter before being mounted in the gear box.

In order to insure suitable retention of the shoes on the ends of the fork arms during functioning of the gear box and particularly during rotation of the pinion of the sliding gear or of the dog clutch coupling which represents the driving gear with which the shoes cooperate, the height of the lugs of the shoes is selected so as to be greater than the thickness of the lateral flanks of the shoes plus the functional play before wear between the side flanks of the shoes and the corresponding flanks of the driving gear. The lugs are thus at all times maintained in the notches of the fork arms even when the side flanks of the shoes are completely worn. Thus, in all operating conditions the shoes are held by their lugs against stresses due to the rotation of the sliding gear, the stresses having the tendency to separate them from the ends of the fork arms.

The invention will be better understood upon study of the detailed description of the two embodiments, which are offered by way of non-limiting example and illustrated in the attached drawings, in which:

FIG. 3 is a view in partial section along the line III—III in FIG. 2, looking from above at one of the ends of a fork arm of FIG. 1 after it has been mounted in the groove of a gear box sliding gear;

FIG. 4 is a view in section along a radial plane IV—IV of FIG. 2 of the sliding gear, also showing the ends of the fork arm of FIG. 1;

Figure 1:
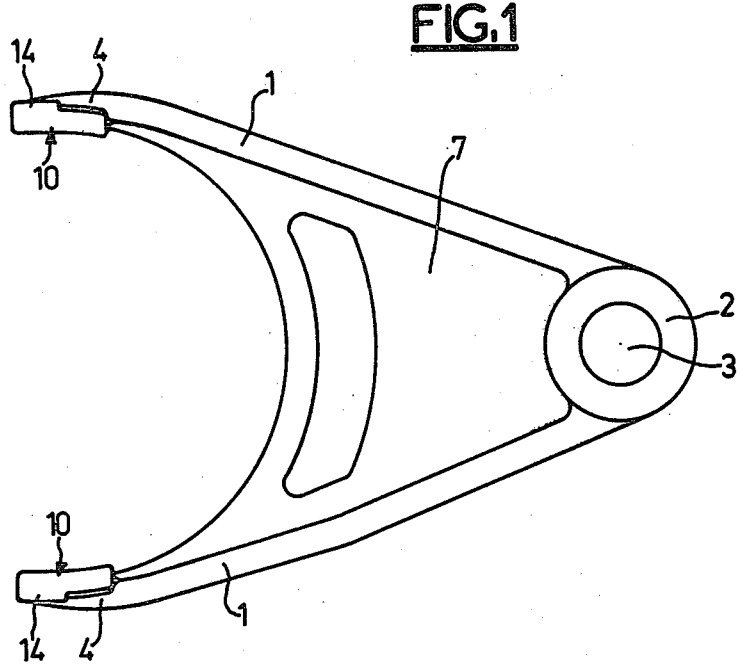
FIG. 1 is a view in elevation of a control fork in accordance with the invention equipped with friction shoes and shown before being mounted in the gear box.

As is shown in FIGS. 1 to 4, the control fork comprises two arms 1 interconnected by a sleeve 2 comprising a bore 3 for receiving a gear box slide block, not shown in the figures. The arms 1 have suitably spaced-apart ends 4 so as to be able to cooperate with the groove 5 of a sliding gear 6 shown in FIGS. 3 and 4. The control fork comprising the arms 1, the sleeve 2 and a reinforcing web 7 is advantageously made by casting from a low-cost material which is resistant to synchronization stresses, for example aluminum, steel, a plastic material reinforced by glass fibers, or the like. It goes without saying that the fork could also be made of stamped or shaped sheet iron.

The end 4 of each arm 1 of the fork has a nick or notch 8 on the outer lateral surfaces 9 of the end 4 which, as may be seen in FIG. 3, is thicker than the arm 1 with which it is integral. The notches 8 are preferably made during casting when the fork is made by casting, or is cut out directly during manufacture of the fork if the fork is made by stamping. All machining operations are thereby avoided, thus reducing the cost of the assembly.

Each fork arm end 4 is equipped with a friction shoe 10 which, as may be seen in FIG. 4, has (in a section taken in a plane that is substantially radial relative to the sliding gear) the shape of a bowl, the side 11 of which comes into frictional contact with the corresponding sides of the groove 5 of the sliding gear 6. The two sides 11 are connected by a peripheral flank 12 which is of substantially cylindrical shape adapted to the cylindrical periphery of the bottom of the groove 5 of the sliding gear 6. It will be noted that in order to allow a slight clearance of the arms 1 of the fork, the outer surfaces of the lateral flanks 11 are not completely planar and have on the contrary a slight curvature, as may be seen in FIG. 3.

In its median part opposite the outer surface coming into contact with the radial flanks of the groove 5, each side flank 11 has a lug 13 whose dimensions are adapted so as to be able to penetrate into the notches 8. It will be noted that the notches 8 extend over the entire height of the end 4 of the arm 1, as will be seen particularly in FIG. 4. As a result, the notches 8 pass through the entire thickness of the end 4, and the shoes 10 may be ratcheted from the inside toward the outside, the lugs 13 penetrating into the notches 8. The two lateral flanks 11 further comprise edges 14 flanged onto the outer peripheral surface 15 of the end 4. Thus, the flanged ends retain the shoes 10 by a snap fit after being stretched by elastic deformation of the flank 11 on the ends 4 of the fork before it is mounted in the gear box, as shown for example in FIG. 1. The flanged edges 14 prevent the shoes 10 from becoming detached from the ends 4; such detachment would not be prevented by the lugs 13 alone, taking into account the traversing character of the notches 8.

Figure 2:
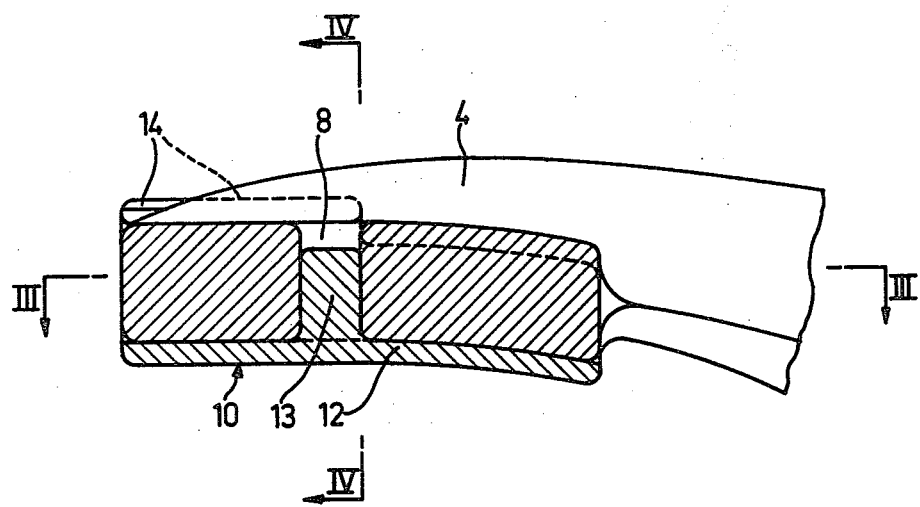
FIG. 2 is an enlarged view in section taken along line II—II of FIG. 4 of the end of a fork arm in accordance with FIG. 1, shown equipped with its friction shoe.

The flanged edges 14 extend only over a portion of the length of the shoes 10, as may be seen in FIGS. 1 and 2, where it will be noted that the flanged edge 14 extends from the free edge of the end 4 up to and past the lug 13.

During operation of the control fork in accordance with the invention, the sliding gear 6 is rotatively driven in a direction opposite the arrow F of FIG. 3, producing a reaction stress directed in the direction of the arrow F and tending to detach the shoe 10 from the end 4 of the arms 1. Such detachment is prevented by the presence of the lugs 13 retained in the notches 8. It is however advisable to select a suitable height for the lugs 13 such that they may not come out from the notches 8 when the thickness of the lateral flanks 11 has been reduced by wear after a certain period of operation.

Figure 9:
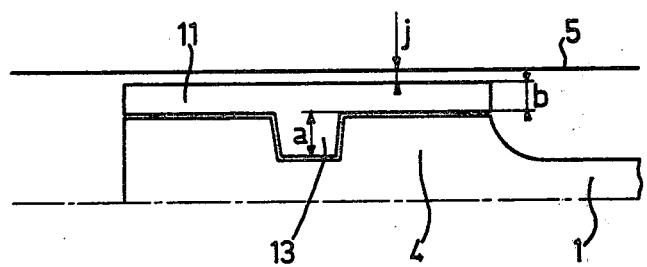
FIG. 9 shows very schematically the differences in wall thicknesses of a shoe of a fork in accordance with the invention, mounted in the groove of a sliding gear before wear, the view being taken from above, analogously to FIGS. 3 and 7.
Figure 10:
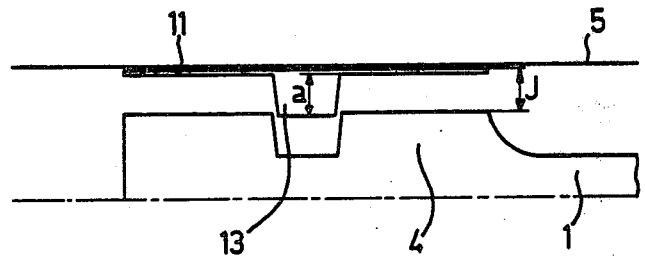
FIG. 10 is a view analogous to FIG. 9 after wear.

FIGS. 9 and 10 show this situation schematically. In FIG. 9, which shows the parts schematically before wear, the lug 13 has a total height a. The lateral flank 11 has a thickness b, and there is play j between the outer surface of the flank 11 and the corresponding surface of the groove 5 of the sliding gear. The play j before wear, the magnitude of which is exaggerated in FIG. 9, is in practice very slight, and has not therefore been shown in FIGS. 1 to 4 so as not to complicate them.

In FIG. 10, the same parts are shown after an assumed practically complete wear of the lateral flank 11. In this case, assuming that the thickness of the flank 11 is reduced to zero, the play after wear is J. Thus it is seen that the height a of the lug 13 must be in any event greater than the maximal play J after wear, if it is desired to prevent the stresses exerted during operation on the friction shoe 10 from becoming capable of detaching it from the end 4. When considering FIGS. 9 and 10, it will be seen that the play J after wear is always less than or equal to the sum of the play j before wear plus the starting thickness b of the flank 11. Thus: $J \leq b+j$.

In order to be sure to avoid detachment, it is thus sufficient to arrive at:

$$a > b+j$$

that is, that the selected height a of the lugs be greater than the thickness of the lateral flanks b of the shoes 10 plus the functional play j before wear.

FIGS. 5 to 8 show a second embodiment in which the analogous parts bear the same reference numerals. In this embodiment, each end 4 of an arm 1 comprises two notches 16 on the outer lateral surfaces but extending only over a portion of the height of the end 4, as will be seen in FIG. 8. In other words, the notches 16 do not go all the way through as did the notches 8 of the first embodiment, a solid portion 4a remaining at the bottom of the end 4, that is to say in the axial direction of the sliding gear 6. As before, the friction shoes 17 mounted on the ends 4 have lateral flanks 18 coming into contact with the corresponding flanks of the groove 5 of the sliding gear 6 and connected together by a peripheral flank 19 of the same configuration as the flank 12 of the first embodiment. As before, the lateral flanks 18 have on their inner surface a lug 20 penetrating into the notches 16 and having a chamfered inner surface 20a shown in FIG. 8 which facilitates the map locking of the shoes 17 from the inside toward the outside by deformation of the flanks 18 around the portion 4a of the end 4.

Figure 5:
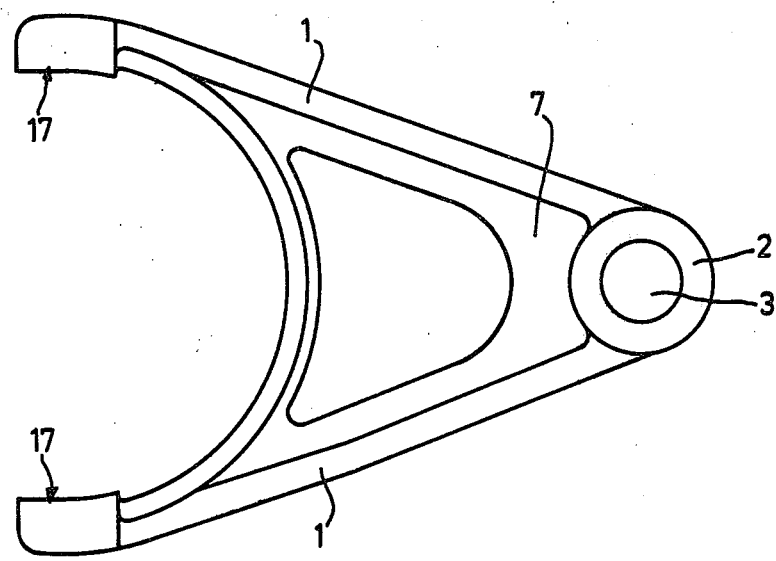
FIG. 5 is a view in elevation, analogous to FIG. 1, of a second embodiment of a control fork in accordance with the invention.

Contrary to what was the case for the lugs 13 of the first embodiment, the lugs 20 have a double function. Like the lugs 13, they first insure suitable retention of the shoes 17 on the ends 4 during operation of the gear box, avoiding detachment of the shoes 17 during rotation of the sliding gear 6. The second function of the lugs 20 is to retain the shoes 17 in position during manipulation of the fork prior to its being mounted in the gear box, as shown in FIG. 5. Once mapped into the notches 16, the lugs 20 can no longer escape, since said notches do not go all the way through.

Figure 6:
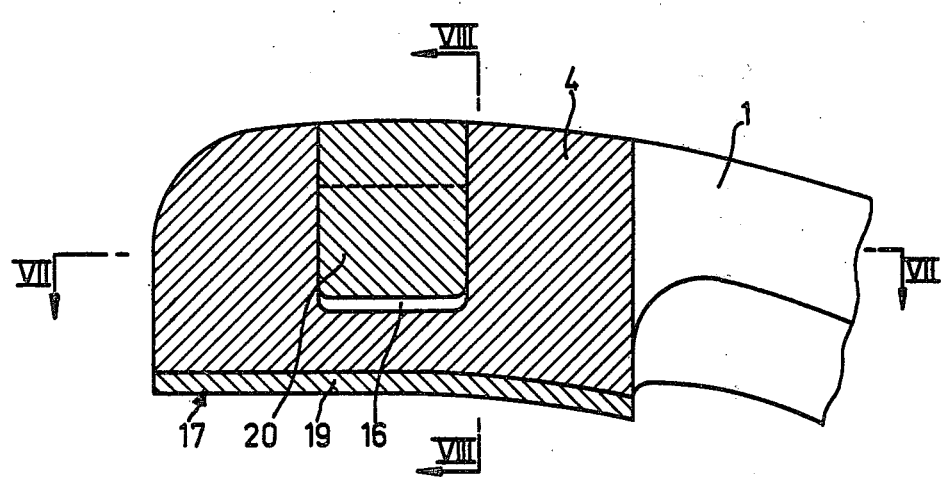
FIGS. 6, 7 and 8 are sectional views taken along respective corresponding lines VI—VI (in FIG. 8), and VII—VII and VIII—VIII (in FIG. 6); these views are analogous, so far as the embodiment of FIG. 5 is concerned, to FIGS. 2, 3 and 4 for the first embodiment.
Figure 7:
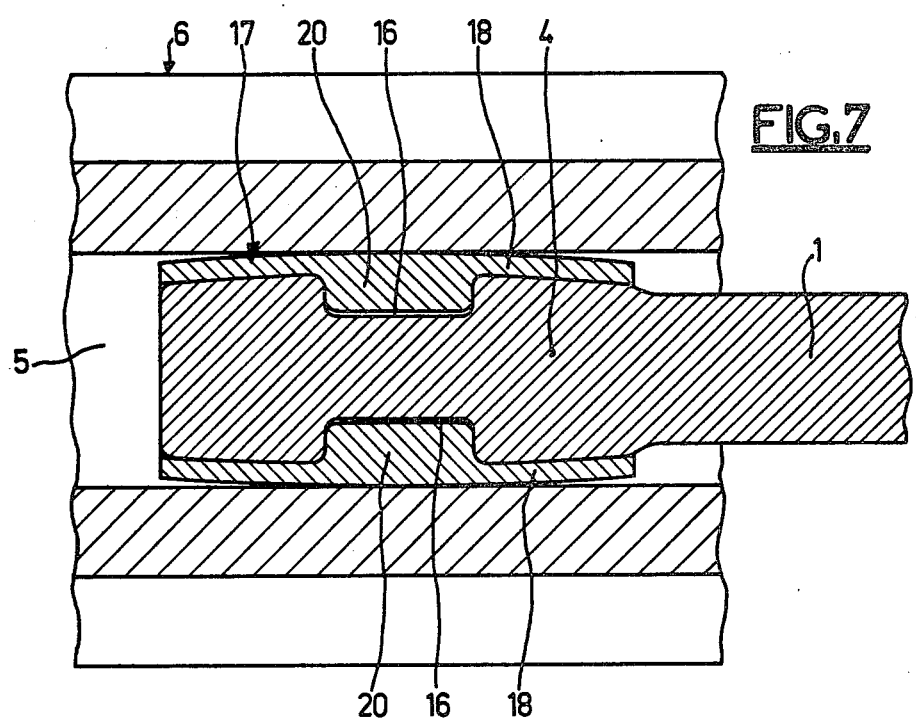
Figure 8:
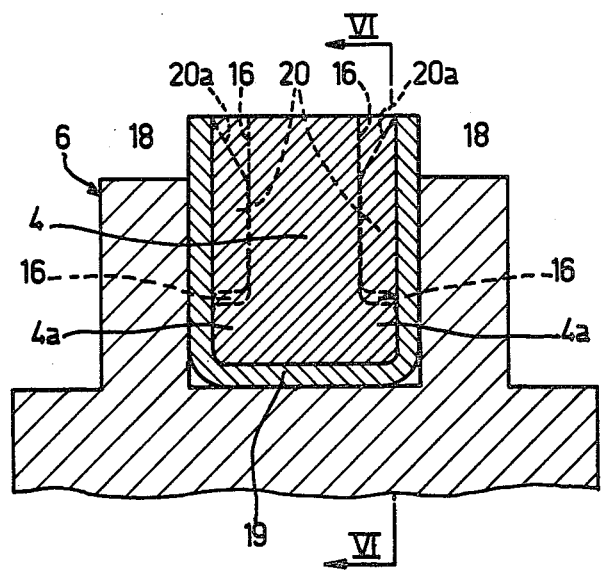

It will further be noted that the height of the lateral flanks 18 of the shoes 17 as well as the corresponding height of the ends 4 are greater in the second embodiment, as will be seen in FIGS. 5, 6 and 8 by comparing them to the FIGS. 1, 2 and 4. It will further be noted that the size of the lugs 20 and of the notches 16 in peripheral direction, as shown in FIG. 7, is also greater in size than the same elements in the first embodiment, as may be seen by comparing FIG. 7 to FIG. 3.

Apart from these differences, the operation of the assemblies is the same, particularly so far as the choice of the height a of the lugs 20 as a function of the thickness b of the lateral flanks 18 before wear and of the functional play j before wear is concerned.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A synchronization and clutch control fork for a gear box, the fork having outer lateral surfaces with notches therein and comprising two friction shoes mounted on the two arms of the fork and intended to come into contact with the periphery of a driving gear, characterized in that each shoe comprises inside its lateral flanks two lugs which are snap-fit into the two notches in the outer lateral surfaces of the arms of the fork, the notches extending over the entire height of the arms of the fork, each shoe further comprising edges flanged onto the outer peripheral surface of the arm of the fork.

2. A control fork in accordance with claim 1, characterized in that the flange edges extend over a portion of the length of the shoes.

3. A synchronization and clutch control fork for a gear box, the fork having outer lateral surfaces with notches therein and comprising two friction shoes mounted on the two arms of the fork and intended to come into contact with the periphery of a driving gear, characterized in that each shoe comprises inside its lateral flanks two lugs which are snap-fit into the two notches in the outer lateral surfaces of the arms of the fork, the notches extending over a portion of the height of the arms of the fork.

4. A synchronization and clutch control fork control fork for a gear box, the fork having outer lateral surfaces with notches therein and comprising two friction shoes mounted on the two arms of the fork and intended to come into contact with the periphery of a driving gear, characterized in that each shoe comprises inside its lateral flanks two lugs which are snap-fit into the two notches in the outer lateral surfaces of the arms of the fork, the lugs being provided in a median portion of the length of the shoes.

5. A synchronization and clutch control fork for a gear box, the fork having outer lateral surfaces with notches therein and comprising two friction shoes mounted on the two arms of the fork and intended to come into contact with the periphery of a driving gear, characterized in that each shoe comprises inside its lateral flanks two lugs which are snap-fit into the two notches in the outer lateral surfaces of the arms of the fork, the height of the lugs being greater than the thickness of the lateral flanks of the shoes plus the functional play prior to wear between the lateral flanks of the shoes and the corresponding flanks of the driving gear.

* * * * *